2 Sheets—Sheet 1.

J. HUBBELL,

Assignor to E. P. ALLIS.

Head-Blocks for Saw-Mills.

No. 9,078. Reissued Feb. 17, 1880.

WITNESSES

C. F. Dean

Henry C. Hazard

INVENTOR.

Joseph Hubbell

PER Jno K. Hallock

ATTY.

N. PETERS, PHOTO-LITHOGRAPHER, WASHINGTON, D. C.

J. HUBBELL,

Assignor to E. P. ALLIS.

Head-Blocks for Saw-Mills.

No. 9,078. Reissued Feb. 17, 1880.

WITNESSES

C. F. Dean.

Henry C. Hazard.

INVENTOR

Joseph Hubbell

PER Jno K. Hallock

ATTY.

N. PETERS, PHOTO-LITHOGRAPHER, WASHINGTON, D. C.

UNITED STATES PATENT OFFICE.

JOSEPH HUBBELL, OF DAYTON, OHIO, ASSIGNOR TO EDWARD P. ALLIS.

HEAD-BLOCK FOR SAW-MILLS.

SPECIFICATION forming part of Reissued Letters Patent No. 9,078, dated February 17, 1880.

Original No. 95,904, dated October 19, 1869. Application for Reissue filed January 20, 1880.

*To all whom it may concern:*

Be it known that I, JOSEPH HUBBELL, of Dayton, in the county of Montgomery and State of Ohio, have invented certain new and useful Improvements in Head-Blocks for Saw-Mills; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

It is the object of my invention to so construct the mechanism for operating head-blocks for saw-mills that the material to be sawed shall be moved with certainty and rapidity the distance desired, and so that, in so moving the said material, the actuating mechanism shall be moved by each vibration of the actuating-lever, and so that the jacks or knees which move the material may be disengaged from the propelling mechanism to admit of their reverse movement being more rapidly effected.

The improvements to be claimed will hereinafter fully appear.

Figure 1:
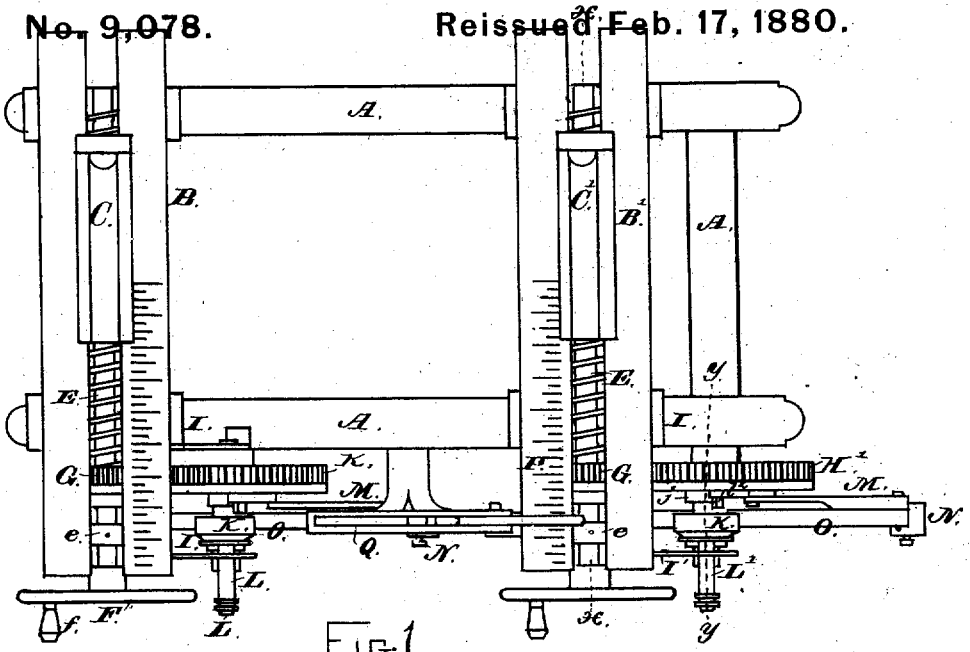
Figure 2:
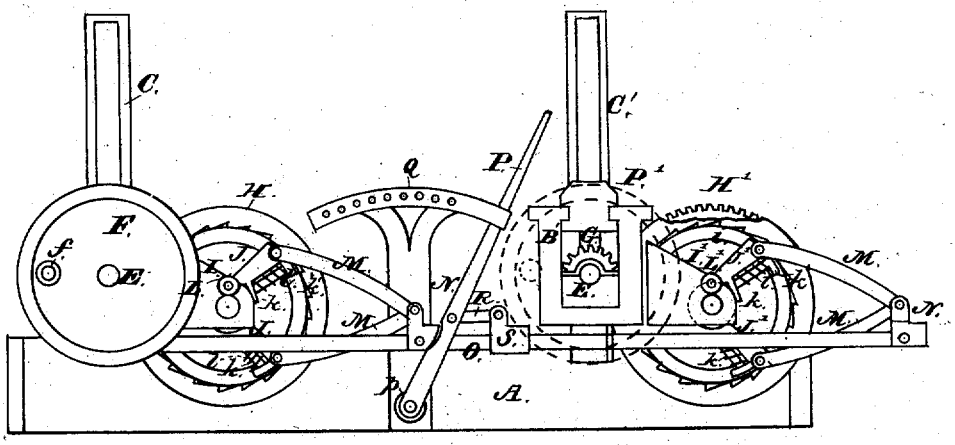
Figure 3:
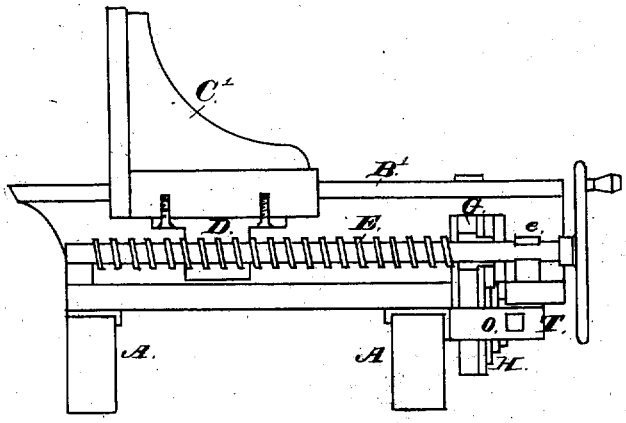
Figure 4:
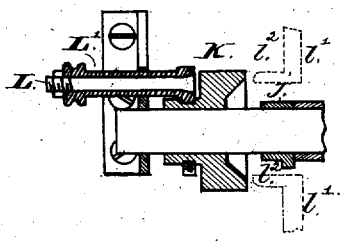
Figure 5:
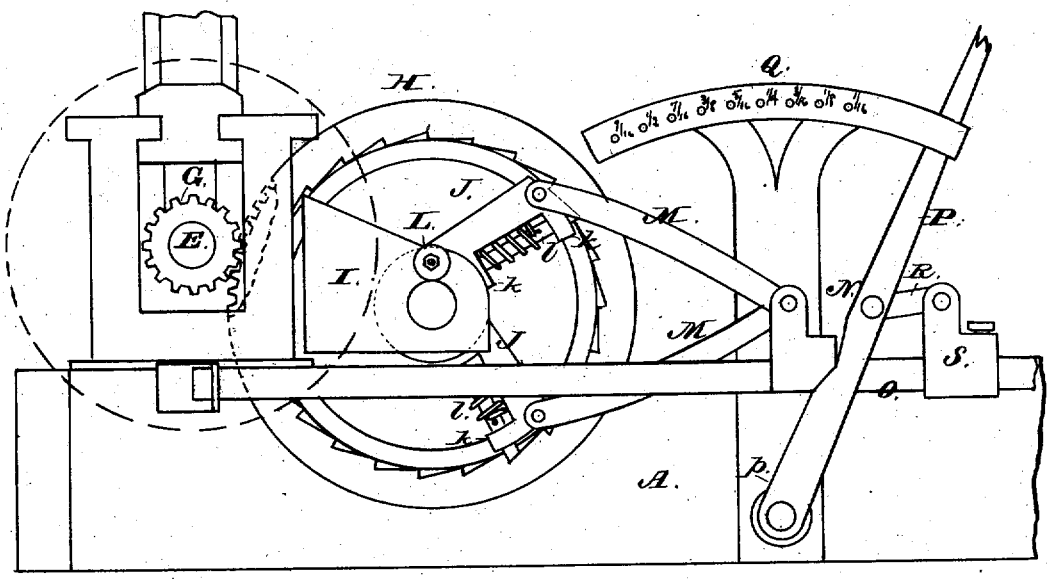

In the accompanying drawings my invention is illustrated as follows: Figure 1 is a plan view of a saw-mill carriage having my improvements applied thereto. Fig. 2 is a view in elevation of the same, looking toward the saw-line. Fig. 3 is a vertical transverse section on the line *x x* in Fig. 1. Fig. 4 is a like section, on an enlarged scale, on the line *y y* in Fig. 1, showing the pawl-retracting device. Fig. 5 is a similar view to Fig. 2, on an enlarged scale, and showing only one knee and its advancing mechanism. Figs. 2 and 5 show parts broken away, so as to show parts beyond, as in Fig. 2 the hand-wheel F is shown by dotted lines at the right hand of the figure, and in Fig. 5 it is also shown in dotted lines.

The construction and operation of my device are as follows, reference being had to the drawings, and to the letters of reference marked thereon:

A represents the timbers of the carriage. B B′ are the blocks, which are slotted and recessed, as shown in Figs. 1, 2, and 5. C C′ are the knees or feeding-jacks, which are grooved and adapted to operate in the slots and recesses of the blocks, as seen in Figs. 2 and 5. D is a threaded socket or screw-nut attached to each of the knees, and lies within the recess of the block, when it engages with a screw-shaft, E, which lies longitudinal with the blocks within said recesses, and is supported by suitable bearings, and is provided on the outer end with a hand-wheel, F, and at a point within the block with a cog-pinion, G.

When the knee is to be advanced the screw is operated by mechanism which connects with the gear G, and when it is to be receded it is operated by the hand-wheel. It is also operated by the hand-wheel when it is desired to set the knees to receive a new log, if said knees are receded too far; but the screw and the hand-wheel form no essential part of my invention, and are not new in the place and for the purposes shown.

The essential part of my invention in this particular consists in the construction and operation of the mechanism which operates the knee when setting the log toward the saw.

The features of such a mechanism, and which I attain by my construction, are, first, a firm, steady movement of the knee, which movement is to be derived from a quick, sharp, vibrating movement of the setting-lever; second, a movement of the knees by each movement of the setting-lever.

Devices have been heretofore constructed by which this latter end has been accomplished, but in a crude and insufficient manner, and not so as to accomplish the former end. The means I employ are as follows: Two large spur-gears, H H′, (a portion of which is shown as broken away in Fig. 2,) have their shafts secured in bearings in brackets I I I′ I′, fastened to and extending laterally from the head-blocks. These driving-wheels H H′ gear into the pinions G on the screw-shaft. They are also constructed with flange-ratchets, as shown in Figs. 2 and 5, the teeth of the ratchets being on the inside of the flanges. The pawls which act upon these ratchets are supported on concentric carriers, which are operated by being connected with the actuating mechanism by connecting-rods.

J J J′ J′ are the concentric pawl-carriers. They are collared loosely to the ratchet or drive wheel shaft by sleeves *j j*, which are cast with the pawl-carriers J, &c. The pawls are marked *l l'*, and are what are known as "spring-plunger" pawls, and work in openings in arms *k k'*, extending from the pawl-carriers J, &c. In the movement of the machine these pawls oscillate toward and from each other and act alternately upon the ratchet. They are operated as follows: Along the front of the carriage is a rod, O, which is made to vibrate longitudinally by means of a pivoted lever, P. (See Figs. 2 and 5.) On the rod O, at the proper points, are placed standards, studs, or brackets N. To these are pivoted connecting-rods M, which are connected by pivots to the pawl-carriers. As the lever P is vibrated the pawl-carriers are made to oscillate toward and from each other and operate the pawls upon the ratchets. The action of the pawls upon the ratchets is alternate, and hence the movement of the ratchet is continuous.

I am aware that a device has been heretofore constructed which had a vibrating lever, a longitudinally-vibrating bar, to which were attached two pawls that were long enough to reach onto and engage with a double ratchet on the screw-shaft, and which, as the lever was vibrated, alternately operated the said screw-shaft by means of the double ratchet, said double ratchet having its teeth pointing in opposite directions. I therefore do not desire to claim or include as part of my invention such a device.

Where the pawls which act upon the ratchets connect directly with the vibrating bar or other device for moving them which is not concentric with the ratchet, they necessarily have a very limited sweep or traverse upon the ratchet, and their action upon the teeth at the extremes of their traverse is too uncertain and too liable to slip unless the teeth of the ratchet are made very large, which is not desirable where fine or minute settings are required; but when the pawls are carried on concentric carriers the relation of the pawl is the same to all the teeth of the ratchet over which it traverses, and hence the teeth may be as fine as desired, and hence the most minute settings can be accomplished, and the pawls can have as much traverse on the ratchet to each vibration of the lever as the connections will allow, and the pawls will engage as firmly with the last tooth of the traverse as with those on the top of the ratchet. Consequently, when proper connections are employed, the knees of the head-block may be made to traverse a comparatively wide space at one sweep or vibration of the setting-lever, which is very desirable, as quick work in sawing thick stuff is attainable.

In order to quickly reverse the knee by such mechanism as may be provided therefor, it is necessary that the pawls may be quickly disengaged from the ratchet, so as to permit of its reverse movement. My device therefor is illustrated in Fig. 4, and consists of a cup-cam, K, which slides on the shaft of the wheel H and engages with feet $l^2$, which extend from the lower ends of the pawls *l'*. The cup-cam is operated by a push-rod, L, which passes through the bracket I in a rod-sleeve, L'.

A recess on one side of each opening in the brackets for the push-rods admits of a pin on each rod-sleeve L' passing through the opening, and after the pins have passed, with the rods and their casings or sleeves, through these openings, by turning the sleeves the pins prevent the rods from retracting and lock down the pawls.

By this device either wheel may be disengaged from the pawls, so as to move only one end of the material to be sawed. When the pawls are thus disengaged the knee can be receded by revolving the screw-shaft by means of the hand-wheels F F.

What I claim as new is as follows:

1. The combination, within the setting mechanism of a saw-mill head-block, of a ratchet device which is operated upon by two pawls, which are respectively attached to carriers which are pivoted concentric with said ratchet, and are operated by being connected with an actuating-lever in a manner substantially as shown, whereby the said pawls, as the actuating-lever is moved, shall oscillate toward and from each other alternately, and thereby alternately engage with said ratchet, for the purposes mentioned.

2. The combination, within a saw-mill head-block, of a shaft from which the knee is actuated, a ratchet device for actuating said shaft, which consists of a ratchet-wheel, two concentric pawl-carriers, to which are respectively attached spring-pawls for engaging the said ratchet, and connecting-rod for connecting said carriers with an actuating mechanism which, as it is operated, will cause the said pawls to alternately engage with the said ratchet, substantially as set forth.

3. In a saw-mill head-block which has a ratchet device which consists of a ratchet-wheel, concentric pawl-carriers, and spring-pawls, the combination therewith of a cam which engages with said pawls and withdraws them from the ratchet, substantially as set forth, and for the purposes mentioned.

4. In a saw-mill head-block in which the knees are advanced by screw-shafts, the combination therewith of a ratchet-wheel, concentric pawl-carriers with spring-pawls, rods connecting said carriers with an oscillating bar or pitman, and an actuating-lever for oscillating said bar, all constructed and arranged to operate substantially as and for the purposes mentioned.

In testimony that I claim the foregoing I have hereunto set my hand this 23d day of December, 1879.

JOSEPH HUBBELL.

Witnesses:
JNO. K. HALLOCK,
E. D. BESTOR.